US010301035B2

(12) United States Patent
Bedrine et al.

(10) Patent No.: US 10,301,035 B2
(45) Date of Patent: May 28, 2019

(54) METHOD AND CONFIGURATION FOR AN AUXILIARY POWER ENGINE TO DELIVER PROPULSIVE AND/OR NON-PROPULSIVE ENERGY IN A HELICOPTER ARCHITECTURE

(71) Applicants: SAFRAN HELICOPTER ENGINES, Bordes (FR); SAFRAN POWER UNITS, Toulouse (FR); SAFRAN ELECTRICAL & POWER, Blagnac (FR)

(72) Inventors: Olivier Bedrine, Bosdarros (FR); Christian Sarrat, Mauvezin (FR); Fabien Silet, Pechbonnieu (FR); Sebastien Vieillard, La Chapelle Gauthier (FR)

(73) Assignees: SAFRAN HELICOPTER ENGINES, Bordes (FR); SAFRAN POWER UNITS, Toulouse (FR); SAFRAN ELECTRICAL & POWER, Blagnac (FR)

( * ) Notice: Subject to any disclaimer, the term of this patent is extended or adjusted under 35 U.S.C. 154(b) by 911 days.

(21) Appl. No.: 14/410,671

(22) PCT Filed: Jun. 12, 2013

(86) PCT No.: PCT/FR2013/051379
§ 371 (c)(1),
(2) Date: Dec. 23, 2014

(87) PCT Pub. No.: WO2014/001683
PCT Pub. Date: Jan. 3, 2014

(65) Prior Publication Data
US 2015/0143950 A1 May 28, 2015

(30) Foreign Application Priority Data

Jun. 29, 2012 (FR) ...................... 12 56246

(51) Int. Cl.
*B64D 41/00* (2006.01)
*B64C 27/04* (2006.01)
(Continued)

(52) U.S. Cl.
CPC .............. *B64D 41/00* (2013.01); *B64C 27/04* (2013.01); *B64C 27/12* (2013.01); *B64D 27/24* (2013.01);
(Continued)

(58) Field of Classification Search
CPC .. B64D 41/00; B64D 2041/002; B64C 27/00; B64C 27/04; B64C 27/12
See application file for complete search history.

(56) References Cited

U.S. PATENT DOCUMENTS 3,455,182 A * 7/1969 Kelley .................... B64C 27/12
244/17.11
4,479,619 A 10/1984 Saunders et al.
(Continued)

FOREIGN PATENT DOCUMENTS

CA 2876975 A1 * 1/2014 ............. B64D 41/00
EP 0 091 744 10/1983
(Continued)

OTHER PUBLICATIONS

English Translation of EP 2404775.*
International Search Report dated Aug. 30, 2013 in PCT/FR13/051379 Filed Jun. 12, 2013.

Primary Examiner — Richard R. Green
Assistant Examiner — Aaron M Rodziwicz
(74) Attorney, Agent, or Firm — Oblon, McClelland, Maier & Neustadt, L.L.P.

(57) ABSTRACT

A method and configuration to optimize an entire traction system available on a helicopter including an auxiliary engine by allowing the engine to provide non-propulsive
(Continued)

and/or propulsive power during flight. The auxiliary engine is coupled to participate directly in providing mechanical or electrical propulsive power and electrical non-propulsive power to the aircraft. An architecture configuration includes an on-board power supply network, two main engines, and a system for converting mechanical energy into electrical energy between a main gearbox to the propulsion members and a mechanism receiving electrical energy including the on-board network and power electronics in conjunction with starters of the main engines. An auxiliary power engine provides electrical energy to the mechanism for receiving electrical energy via the energy conversion system and a mechanism for mechanical coupling between the auxiliary engine and at least one propulsion member.

14 Claims, 8 Drawing Sheets

(51) Int. Cl.
*B64C 27/12* (2006.01)
*B64D 27/24* (2006.01)
*B64D 27/02* (2006.01)

(52) U.S. Cl.
CPC .. *B64D 2027/026* (2013.01); *B64D 2041/002* (2013.01); *B64D 2221/00* (2013.01); *Y10T 74/19014* (2015.01)

(56) References Cited

U.S. PATENT DOCUMENTS

| | | |
|---|---|---|
| 6,247,668 B1 | 6/2001 | Reysa et al. |
| 2004/0129835 A1* | 7/2004 | Atkey ............... B64D 13/06 244/118.5 |
| 2006/0102790 A1 | 5/2006 | Atkey et al. |
| 2007/0267540 A1 | 11/2007 | Atkey et al. |
| 2007/0284480 A1 | 12/2007 | Atkey et al. |
| 2011/0121127 A1* | 5/2011 | Certain ............... B64D 35/04 244/17.19 |
| 2012/0025032 A1* | 2/2012 | Hopdjanian ......... B60L 3/0046 244/53 R |

FOREIGN PATENT DOCUMENTS

| | | | |
|---|---|---|---|
| EP | 1 069 044 | 1/2001 | |
| EP | 2 404 775 | 1/2012 | |
| EP | 2636596 A2 * | 9/2013 | ............ B64C 27/12 |
| FR | 2992024 A1 * | 12/2013 | ............ B64D 35/08 |
| WO | 2004 037641 | 5/2004 | |

* cited by examiner

METHOD AND CONFIGURATION FOR AN AUXILIARY POWER ENGINE TO DELIVER PROPULSIVE AND/OR NON-PROPULSIVE ENERGY IN A HELICOPTER ARCHITECTURE

TECHNICAL FIELD

The invention relates to a method and to an architecture configuration for supplying propulsive and/or non-propulsive power in a helicopter architecture by means of an auxiliary power engine, for example an auxiliary power unit (APU), as well as to an architecture for implementing this method. The supply of energy is said to be direct insofar as it does not pass through the main engines of the helicopter. 'Auxiliary engine' means any thermal system that allows power to be supplied, such as an APU unit, but also generally means a free-turbine or connected-turbine gas turbine, of the 'main engine' type, or a thermal engine, for example a diesel engine, or a fuel cell.

Current helicopters are routinely equipped with main engines, which provide propulsion, and sometimes with an APU unit, the function of which is to provide non-propulsive power on the ground (transient, electrical and pneumatic ignition of the engines) or during flight when the main engines are not capable of doing so (for example in the event of an engine failure or malfunction).

Helicopters are equipped with main engines, which provide propulsion, and sometimes with an auxiliary engine. Currently, auxiliary engines are APU units, which are small gas turbines, and provide non-propulsive power—electrical, mechanical, hydraulic and/or pneumatic—on the ground or in the various flight phases in which the main engines cannot provide this: in transition phases (take-off, landing) or search phases, in the event of engine failure, in the event of a malfunction of an electrical machine, etc. For example, when an engine fails (also referred to as 'one engine inoperative' (OEI)), the APU unit is switched on so that it provides non-propulsive power in order to reduce or end the electrical contribution of the remaining engine.

When the main engines are in operation, the APU units therefore remain switched off during flight and are thus an unnecessary load. The invention relates to optimising the use of the APU units in order to make their presence cost-effective.

PRIOR ART

A gas turbine basically conventionally comprises a gas generator made up of a compressor—combustion chamber—turbine assembly arranged between an air inlet and an exhaust pipe. In operation, the fuel is introduced into the chamber and the combustion of the fuel/air mixture provides gases that produce energy. These hot gases are expanded in the turbine which mechanically drives the compressor via a high-pressure (HP for short) shaft. This type of architecture and operation is applicable to both main engines of helicopters and APU units.

For the main engines, the drive shaft also transmits the available power to provide propulsive power to the rotors of the helicopter—main rotor and anti-torque rotor—as well as (electrical, pneumatic, hydraulic) non-propulsive power. The power is transmitted via a main gearbox, referred to as MGB. In modern engines, the combustion gases are subject to a second expansion in a free turbine prior to driving the MGB. The MGB transmits power to the rotors, to the electrical system which powers the on-board power supply network of the helicopter, as well as to the other equipment that uses energy (pump, load compressor, etc.), in particular of the environmental conditioning system (ECS).

For the APU units, their turbine only drives the accessories that use non-propulsive power via a gearbox mounted on their shaft. Current helicopter architectures comprising an APU unit therefore do not use all of the available power capacity to provide non-propulsive and propulsive power during flight. In particular, when the main engines are in operation, the APU unit is switched off and is thus an unnecessary load.

DESCRIPTION OF THE INVENTION

The invention aims to optimise the entire traction system available on a helicopter equipped with an auxiliary engine by allowing said engine to provide non-propulsive and/or propulsive power during flight. For this purpose, said auxiliary engine is coupled so as to be able to participate in providing propulsive, i.e. mechanical or electrical, energy and electrical non-propulsive power of the aircraft, in flight phases in which supplying additional energy makes it possible to improve the performance of the helicopter and/or to achieve optimised distribution of the energy sources.

More specifically, the present invention relates to a method for supplying propulsive and/or non-propulsive power in a helicopter architecture comprising an on-board power supply network and a main traction system coupled to a mechanical transmission system which drives propulsion members during flight. A conversion of mechanical energy into electrical energy coupled to the mechanical transmission system and/or to the main traction system provides non-propulsive power to the on-board power supply network. The method consists in coupling, by converting energy, an additional auxiliary engine to the on-board network, in order to be able to provide, on the ground, non-propulsive power thereto as well as to the main traction system for its start-up, and to be able to provide, during flight, non-propulsive power to the on-board network in addition to and ultimately instead of the drawing-off which is carried out on the mechanical transmission system and/or the main traction system.

Advantageously, the auxiliary engine also provides electrical energy to a dedicated traction system on the mechanical transmission system in order to increase or partially provide the propulsive power.

Preferably, since the mechanical transmission system comprises a speed reduction system, the auxiliary engine can additionally or alternatively be coupled directly to said speed reduction system in order to provide propulsive power to at least one propulsion member of the helicopter, then coupled, by means of a reversible conversion of energy, to the on-board network in order to provide non-propulsive power, as well as to the main traction system for its start-up. The auxiliary engine can then provide propulsive power to the anti-torque rotor referred to as ATR and/or to the main rotor.

In these conditions, the auxiliary engine is in operation in order to provide propulsive and/or non-propulsive power according to the requirements in the various flight phases, in normal or asymmetrical operation of the main engines. Asymmetrical operation may be involuntary (in the event of malfunction or failure) or voluntary (transitional phases, accelerations, etc.).

According to preferred embodiments:
the electrical energy of the on-board network comes from an adjustment between the energy drawn off from the mechanical transmission system and the main traction system by means of the energy conversion;

the energy conversion is not connected to the reduction system, and therefore the electrical energy of the on-board network only comes from the auxiliary engine via the reduction system when the main traction system is switched off;

the auxiliary engine is integrated in the MGB of the mechanical transmission system such that it provides electrical energy to the on-board network by energy conversion with generators on the MGB and propulsive power to at least one propulsion member via the MGB.

The invention also relates to a configuration for supplying propulsive and/or non-propulsive power in a helicopter. This configuration basically comprises an on-board power supply network, two main engines and a system for converting mechanical energy into electrical energy between a MGB of a system for mechanical transmission to the propulsion members and means for receiving electrical energy comprising the on-board network and power electronics in conjunction with starters of the main engines, the configuration being characterised in that it also comprises an auxiliary power engine for providing electrical energy to the means for receiving electrical energy via the energy conversion system and means for mechanical coupling between the auxiliary engine and at least one propulsion member.

The energy conversion system can comprise generators or reversible motor generator units in connection with the MGB and/or the main engines and/or the auxiliary engine in order to provide electrical energy to the on-board network and to the power electronics.

According to particular embodiments:

the connection between the auxiliary engine and at least one of the propulsion members is produced by a dedicated engine on this member and/or motor generators on the MGB via the power electronics activated by the energy conversion system connected to the auxiliary engine;

the auxiliary engine is integrated in the MGB in conjunction with generators for providing non-propulsive power, the auxiliary engine being able to provide non-propulsive power to the on-board network and to the power electronics via the generators on the MGB and propulsive power via the MGB to at least one propulsion member, i.e. to the main rotor and/or to the ATR;

the connection between the auxiliary engine and the energy conversion system is produced by means of a reduction gear assembly belonging to the mechanical transmission system;

since the mechanical transmission system comprises a reduction gear assembly, said reduction gear assembly directly connects the auxiliary engine to the MGB and/or to the drive shaft of the ATR, and the auxiliary engine to a motor generator and/or to at least one generator forming part or all of the energy conversion system in order to provide electrical energy to the on-board network and to the power electronics;

the gear reduction assembly comprises at least two lines of speed reduction gears coupled by at least one stub shaft between the auxiliary engine mounted on the first line and a power take-off on the MGB or the ATR mounted on the second line, and in which at least one stub shaft is equipped with a reversible decoupling means and a free wheel so that the auxiliary engine does not drive the main rotor on the ground and that the main rotor does not drive the auxiliary engine on the ground or during flight, respectively;

in the case in which the generator(s) of the energy conversion system is/are connected directly to the reduction gear assembly, the stub shaft equipped with reversible decoupling means and the free wheel drives the power take-off and the generator(s) mounted by means of another free wheel on the second line of gears and/or on at least a second stub shaft equipped with a free wheel between a generator and the auxiliary engine;

in the case in which the auxiliary engine has a free turbine, the free turbine drives the generator(s) on the second line of gears of the reduction gearbox via a stub shaft equipped with a free wheel and a brake or on a third line of gears mounted with a free wheel on a stub shaft equipped with a reversible decoupling means and a free wheel, as well as on at least a second stub shaft mounted with a free wheel between the free turbine and a generator;

the reversible decoupling means is selected from a hydraulic coupler, a pawl and a clutch.

BRIEF DESCRIPTION OF THE DRAWINGS

Other aspects, features and advantages of the invention will become apparent from the following non-limiting description, relating to particular embodiments, with reference to the accompanying drawings, in which.

DETAILED DESCRIPTION OF EMBODIMENTS

In all the drawings, identical or equivalent elements having the same function are provided with identical or derivative reference signs. In the case in which several drawings show an element denoted by the same reference sign, this reference refers to the passage in which the element corresponding to this reference sign is described.

Figure 1A:
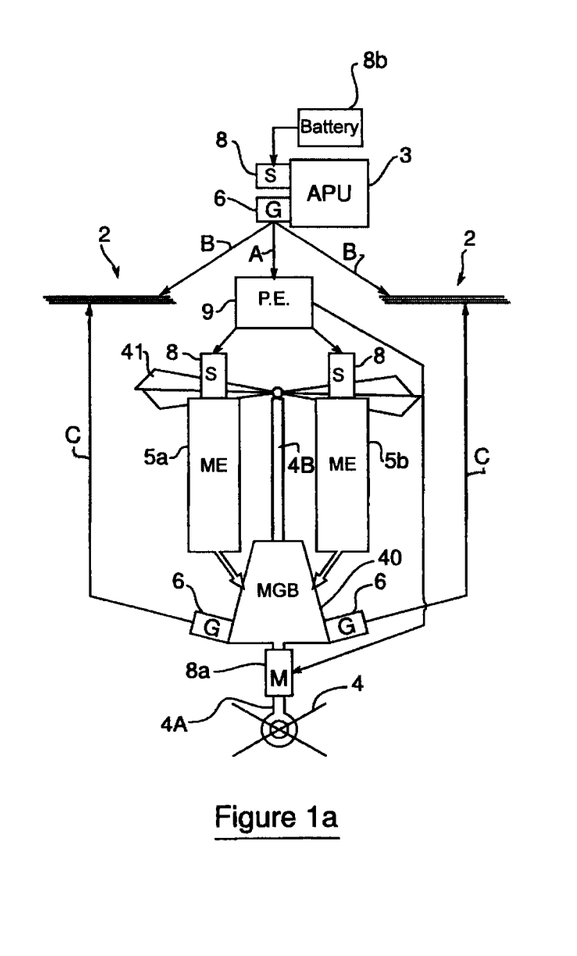
FIGS. 1a and 1b are schematic views of an embodiment of a configuration for supplying energy provided by an auxiliary engine of the APU unit type to the on-board network and to an electric motor mounted on the shaft of the ATR in the case in which the generators of the energy conversion system are mounted directly on the MGB (FIG. 1a) or in reversible motor generator units (FIG. 1b) mounted on the MGB.
Figure 1B:
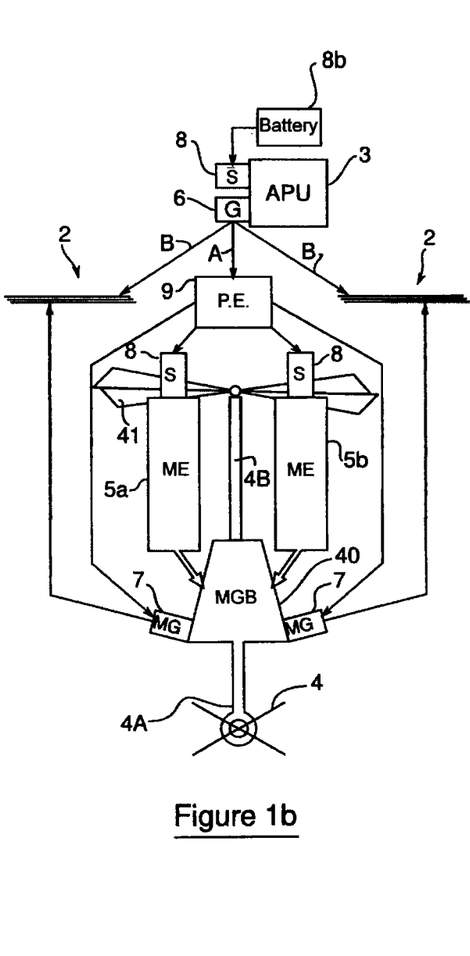

With reference to FIGS. 1a and 1b, the schematic view of the architecture configuration shows the supply of energy or power (in this case) provided by an auxiliary engine 3 of the APU unit type to the on-board network 2 as well as to the anti-torque rotor (referred to as ATR) 4 or to the main gearbox (referred to as MGB) 40 of a helicopter. A basic architecture 1 comprises two main engines 5a and 5b which drive, via the MGB 40, the shaft 4B of the main wing rotor 41 of the helicopter and the shaft 4A of the ATR 4. The main engines 5a and 5b also provide electrical energy to the on-board network 2 via the MGB 40 during flight.

This basic architecture is complemented by the auxiliary engine and the APU unit 3 in the embodiment shown. A system for converting mechanical energy into electrical energy makes it possible to provide electrical energy to the on-board network 2 from the mechanical members, i.e.: the APU unit 3, the MGB 40 and/or the main engines 5a and 5b. This conversion system comprises, coupled to each member and according to the configurations: at least one dedicated electrical generator 6, for example an alternator, at least one reversible electrical machine 7—a motor generator or starter/generator—and/or an electric drive motor 8 or 8a, for example a starter or a dedicated electric motor.

More specifically, the APU unit 3 is coupled to a starter 8, actuated by a battery 8b, and to an electrical generator 6. Once the APU unit is started up, the generator 6 provides electrical energy to the on-board power supply network 2 of the helicopter on the electrical line 'B', as well as to the starters 8 of the main engines 5a and 5b on electrical line 'A' via power electronics 9.

The MGB 40 also provides electrical energy to the on-board network 2 via generators 6 (FIG. 1a) or motor generators 7 (FIG. 1b) on the lines 'C'. The use during flight of the power delivered by the generator 6 of the APU unit 3 to power the power supply network 2 of the helicopter thus makes it possible to adjust and ultimately end the drawing-off of electricity carried out on the generators 6 or the motor generators 7 connected to the MGB 40.

In addition, the generator 6 in conjunction with the APU unit 3 powers—via the power electronics 9—either the electric motor 8a, dedicated to driving the shaft 4A of the ATR 4 or of the main rotor 41 via the MGB 40 (FIG. 1a), or at least one of the motors of the motor generators 7 substituted for the generators 6 (FIG. 1b). The dedicated electric motor 8a is, in the embodiment, mounted on the shaft 4A of the ATR 4, but it can also be mounted on the MGB or on the shaft 4B of the main rotor 41 in other mounting embodiments.

Alternatively, the main engines 5a and 5b can be coupled to a reversible electrical machine or to an electrical generator—with a separate starter—in order to generate electricity. The adjustment of the power supply carried out by providing power from the auxiliary engine again makes it possible to reduce and ultimately end the drawing-off of electricity carried out on the main engines.

In an embodiment of operation of the APU unit 3 during a mission, firstly on the ground then during flight, the various phases of the energy conversion system can take place in succession over time in the following manner:

on the ground:
  starting up (battery 8b, starter 8) the APU unit 3,
  powering the on-board network 2 and starting up the main engines 5a and 5b by means of the APU unit 3,
  powering the on-board network 2 by means of the main engines 5a and 5b via the generators 6 (FIG. 1a) or the reversible electrical machines 7 (FIG. 1b) mounted on the MGB 40,
  switching off the APU unit 3;
during flight:
  starting up the APU unit 3 again and powering the on-board network 2 in order to lessen the drawing-off on the MGB 40 (FIG. 1b), thereby generating additional power on the main rotor,
  powering the electric motor 8 on the MGB 40 and/or on the ATR 4 by means of the APU unit 3, making it possible to increase the power on the main rotor 41.

Figure 2:
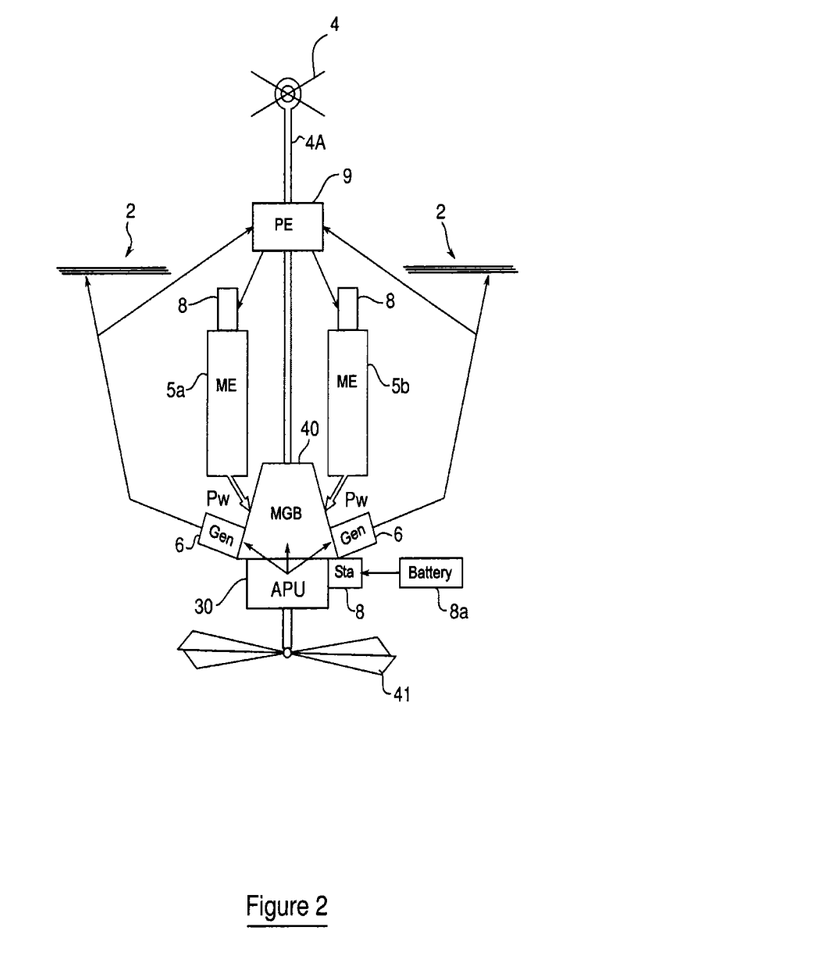
FIG. 2 is a schematic view of an embodiment of a configuration for supplying energy by means of an APU unit wherein the APU unit is integrated in the MGB and is coupled to the electrical generators of the energy conversion system or to the MGB.

A diagram of an architecture configuration of the type shown by FIG. 2 makes it possible to optimise the integration of the auxiliary engine, in this case an APU unit 30. A speed reduction gear assembly of the type described below having a free wheel/free wheels and a pawl or equivalent (see for example the description with reference to FIG. 6b), is advantageously integrated in order to produce such optimisation by making it possible to provide propulsive and non-propulsive power. In this embodiment, the APU unit 30 is equipped with known connection means in order to allow the direct integration thereof in the MGB 40, which is coupled to the electrical generators 6 of the energy conversion system. The APU unit 30 is thus capable of providing:

electrical energy to the on-board network 2 and to the power electronics 9 via the generators 6 on the MGB 40, and
  mechanical propulsion energy to the main rotor 41 via the MGB 40 and/or directly to the drive shaft 4A of the ATR 4.

In addition, the integration of the APU unit 30, or more generally of any auxiliary engine, advantageously makes it possible to fairly distribute certain functions or equipment (speed reduction, oil circuit, etc.) and to limit the interfaces.

Alternatively or in addition to the solutions of electrical transmission for supplying energy to the auxiliary engine, such as those described above, solutions of mechanical transmission between the auxiliary engine and the drive of the MGB/ATR assembly—via a speed reduction gear assembly—are now described. These mechanical architecture configurations make it possible to meet the same requirements.

Figure 3A:
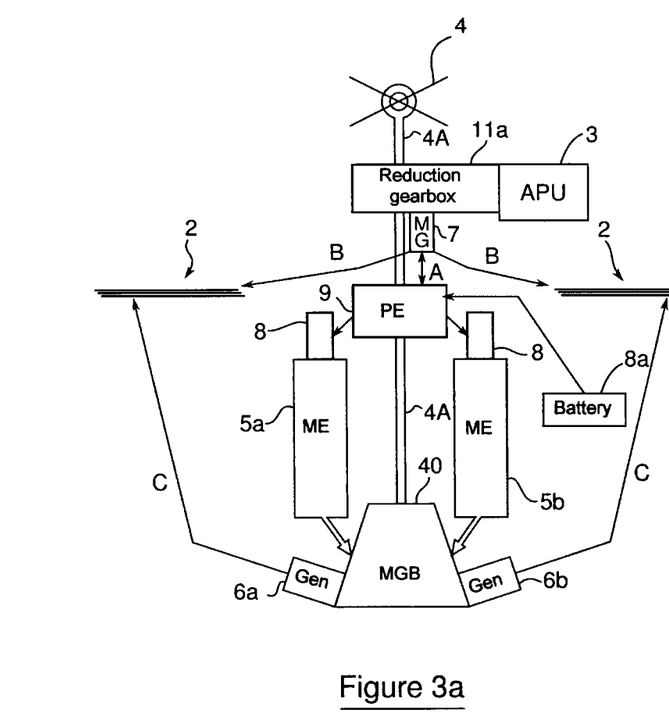
FIGS. 3a and 3b are schematic views of embodiments of a configuration and of a reduction gearbox having this configuration, in the case in which the APU unit is coupled to the MGB/ATR box via a speed reduction gear assembly to which a reversible motor generator of the energy conversion system is coupled and in which the generators of this conversion system are mounted on the MGB.
Figure 3B:
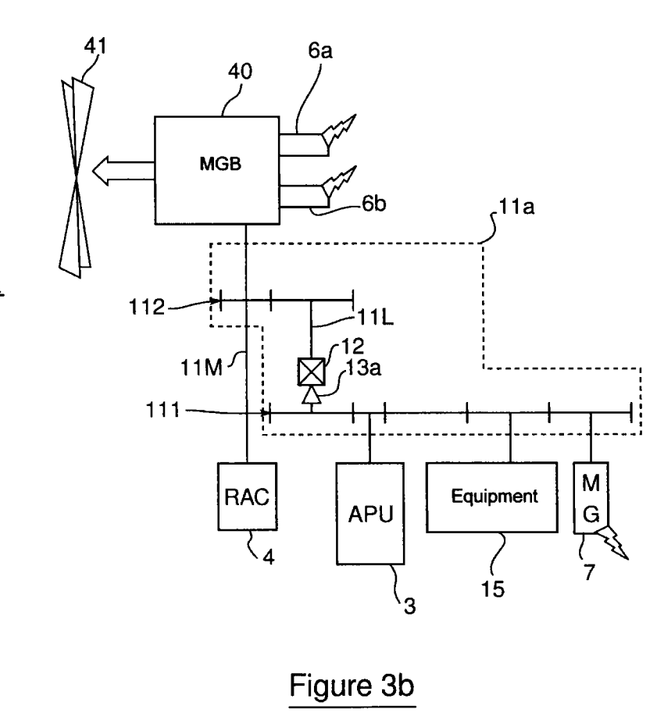

With reference to FIGS. 3a and 3b, diagrams of embodiments of an architecture configuration and of a reduction gearbox from said architecture are shown. In this configuration, the energy conversion system is formed by the generators 6a and 6b coupled to the MGB 40 and by a motor generator 7 coupled to a speed reduction gear assembly 11a in order to provide electrical energy to the on-board network 2 and to the power electronics 9. In this case, the battery 8a is directly connected to the power electronics 9 in order to power and start up only the motor generator 7 of the APU unit 3. The auxiliary APU unit 3 is coupled to the shaft 4A of the ATR 4 via the speed reduction gear assembly 11a, to which the motor generator 7 is coupled for energy conversion. Alternatively, the APU unit can be coupled to the MGB and the generators 6a and 6b can be replaced with reversible or dedicated machines integrated in the main engines (alternative not shown).

The reduction gear assembly 11a forms a mechanical transmission system with the MGB 40. In the non-limiting example shown, the reduction gear assembly 11a directly connects the APU unit 3 to the shaft 4A and to the reversible motor generator 7.

As shown in FIG. 3b, the reduction gear assembly 11a comprises two parallel lines of speed reducing gears, 111 and 112, coupled by at least one stub shaft 11L between the APU unit 3 and the power take-off 11M to the MGB 40 or the ATR 4. The MGB 40 provides mechanical power for the duration to the main rotor 41.

In the line of gears 111, the APU unit 3 provides mechanical power to the equipment 15 (pump, load compressor, etc.) and to the motor generator 7. The power take-off 11M on the MGB 40/ATR 4 assembly is meshed with the line 112.

The stub shaft 11L is equipped with a reversible decoupling means, in this case a pawl 12, and a free wheel 13a. The pawl 12 makes it possible to disconnect the APU unit 3 so that on the ground (in the operating phases where the APU unit 3 is conventionally used), said unit 3 does not drive the MGB 40 and/or the ATR 4 (hereinafter referred to as 'MGB/ATR assembly') and more particularly the main rotor 41. The free wheel 13a makes it possible to prevent, during flight, and in a continuous manner (i.e. without a risk of malfunction in standard conditions), the main rotor 41, driven by the main engines, from in turn driving the APU unit 3. In addition, the free wheel 13a also makes it possible, on the ground, to be able to reconnect the pawl 12 with zero torque.

In these conditions, the reduction gear assembly 11a advantageously makes it possible to reduce the speed between the APU unit 3 and the power take-off 11M on the MGB 40/ATR 4 assembly, so as to be able to introduce mechanical power. The power of the APU unit during flight on the MGB/ATR assembly is thus provided according to requirements.

An improvement in the performance of the helicopter during flight is obtained in particular in the following cases:
  by powering the on-board power supply network 2 by means of the motor generator 7 in order to make it possible to reduce or even end the drawing-off of electricity on the generators 6a and 6b connected to the MGB 40;
  by using the free wheel 13a to drive only the generator of the motor generator 7 by means of the auxiliary engine (the APU unit 3) when the main rotor 41 rotates (the speed of the auxiliary engine always remaining less than that of the main rotor);
  by alternatively or additionally providing mechanical power to the MGB 40/ATR 4 assembly from the reduction gearbox.

According to a variant, the generators of the conversion system are integrated in the reduction gearbox and not in the MGB. This variant is shown by FIGS. 4a and 4b, with diagrams of embodiments of an architecture configuration and of a reduction gearbox in which the APU unit 3 is coupled to the MGB 40/ATR 4 assembly via the speed reduction gear assembly 11a, and in which the generators 6a and 6b of the energy conversion system are mounted on the reduction gear assembly 11a.

The reduction gear assembly 11a (FIG. 4b) again uses the elements from FIG. 3b, with the lines of gears 111 and 112, the stub shaft 11L, the pawl 12 and the free wheel 13a arranged in the same manner. The generator 6a is then mounted directly on the stub shaft 11L and the generator 6b is driven on an additional pinion gear 11P. Alternatively, the pawl 12 can be placed on a connection line other than the connection 11L so that it only drives a single electric machine on the ground.

Figure 5A:
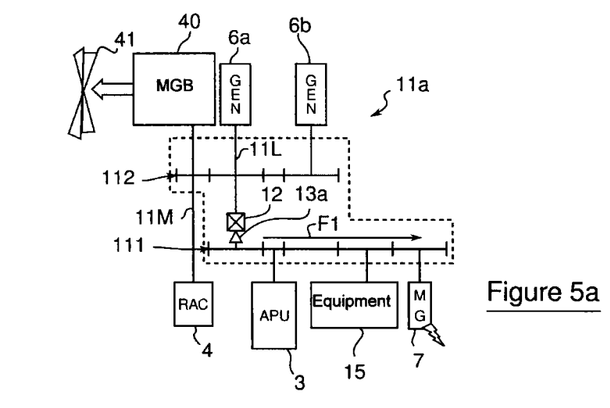
FIGS. 5a to 5d are diagrams of the reduction gearbox according to FIGS. 4a and 4b in four operating phases: the start-up of the main engines by the APU unit on the ground with the stub shaft of the decoupled reduction gearbox, the APU unit and the main engines switched on during flight, the APU unit switched off and the main engines switched on during flight, and the APU unit switched on and a main engine having a failure or partial malfunction.
Figure 5B:
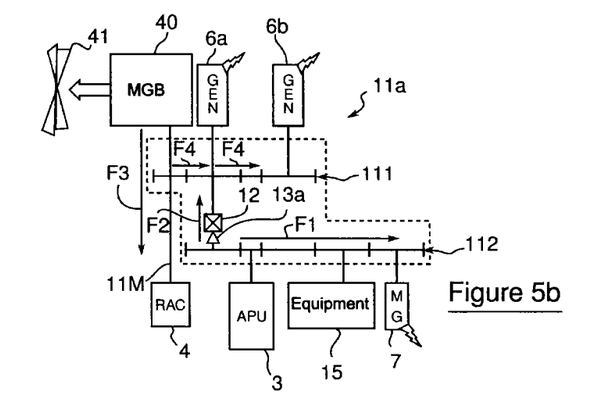
Figure 5C:
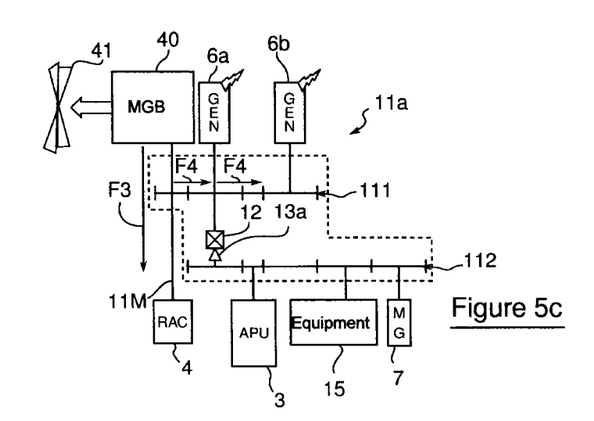
Figure 5D:
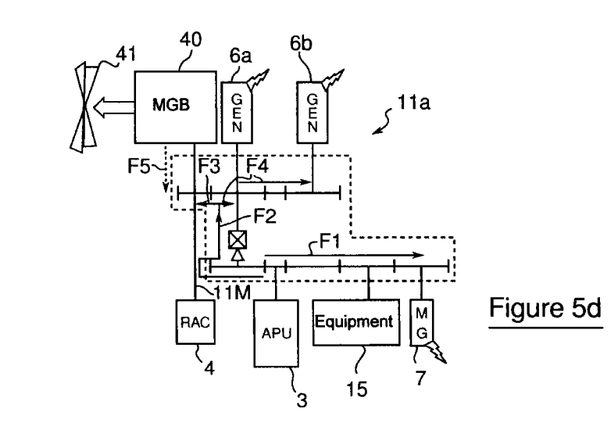

FIGS. 5a to 5d show four operating phases of the reduction gearbox 11a: when the APU unit 3 is switched on the ground whilst the main engines 5a/5b are switched off (FIG. 5a), when the APU unit 3 and the main engines 5a/5b are switched on the ground or during flight (FIG. 5b), when the APU unit 3 is switched off and the main engines 5a/5b are switched on during flight (FIG. 5c), and when the APU unit 3 is switched on and a main engine has a failure or a partial malfunction (FIG. 5d).

Figure 4A:
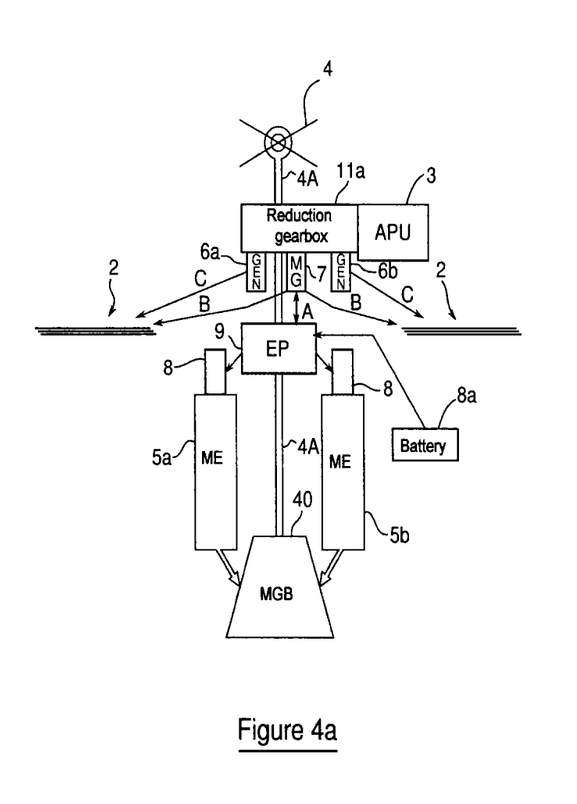
FIGS. 4a and 4b are schematic views of embodiments of a configuration and of a reduction gearbox having this configuration, in the case in which the APU unit is coupled to the MGB/ATR box via a speed reduction gear assembly according to FIGS. 3a and 3b, and in which the generators of the energy conversion system are mounted on the reduction gear assembly.
Figure 4B:
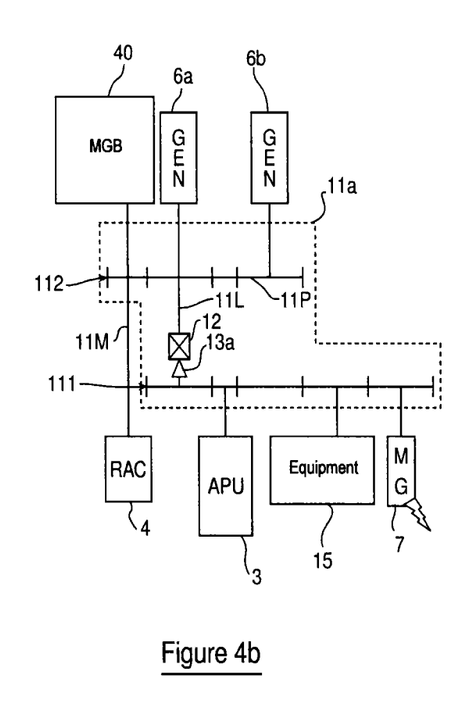

With reference to FIG. 5a, the stub shaft 11L is decoupled and the APU unit 3 provides mechanical power (arrow F1) to the equipment 15 as well as to the motor generator 7 for powering the on-board power supply network 2 and the power electronics 9 (FIG. 4a).

With reference to FIG. 5b, the APU unit 3 always provides mechanical power (arrow F1) to its equipment 15 and to the generator of the motor generator 7 (if the need for additional power is expressed, for example for the on-board network) via the line of gears 112. When the pawl 12 is engaged (arrow F2), the APU unit 3 can also provide propulsive mechanical power—via the line of gears 111—to the power take-off 11M of the MGB 40/ATR 4 assembly (arrow F3) in order to provide propulsive power in particular to the ATR rotor 4, as well as to the generators 6a and 6b (arrows F4) in order to provide electrical power to the on-board network. When the main engines 5a/5b are switched on, the MGB 40, also driven by these engines 5a/5b, can also transmit power to the generators 6a/6b.

With reference to FIG. 5c, when the APU unit 3 is switched off but the engines 5a/5b are switched on, the ATR 4 is driven (arrow F3) by the MGB 40, which in turn is driven by the engines 5a/5b and then transmits power to the generators 6a and 6b (arrows F4) in order to provide non-propulsive power to the on-board network 2, but does not transmit power to the APU unit 3, since the free wheel 13a is disconnected.

With reference to FIG. 5d, when a main engine is idling or stopped (voluntarily or involuntarily) and the pawl 12 is engaged (arrow F2), the APU unit 3 provides to the line of gears 112, via the stub shaft 11L, all the non-propulsive power and some of the propulsive power (the dotted arrow F5 indicates that the drawing-off on the MGB 40 is then reduced, thus increasing the power on the main rotor 41), i.e.
  mechanical power (arrow F1) to the equipment 15 and to the generator of the motor generator 7 (if required),
  propulsive power to the power-take off 11M of the MGB 40/ATR 4 assembly (arrow F3), in particular to the ATR 4 and optionally to the main rotor 41, as well as
  non-propulsive power to the generators 6a and 6b (arrows F4) in order to provide electrical power.

Figure 6A:
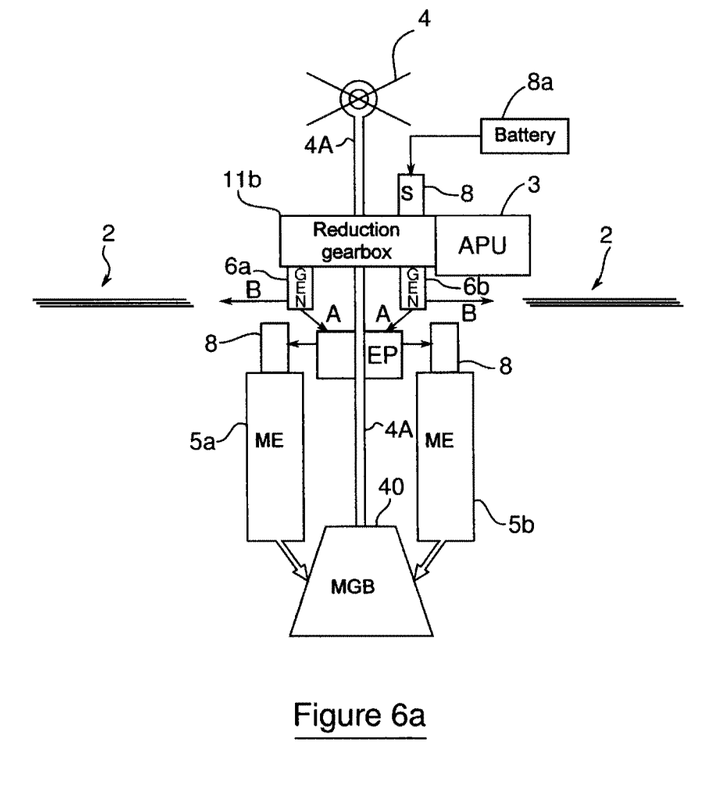
FIGS. 6a and 6b are schematic views of embodiments of a configuration and of a reduction gearbox according to FIGS. 4a and 4b in the case in which the energy conversion only comprises generators which are coupled to the reduction gear assembly.

A variant of the preceding configuration, shown by FIGS. 6a and 6b, again uses the same diagrams as FIGS. 4a and 4b. However, the architecture configuration in FIG. 6a shows a system for converting energy formed solely by the generators 6a and 6b, coupled to a reduction gear assembly 11b, i.e.

without the motor generator 7 in FIGS. 3a/3b and 4a/4b. A specific starter 8a comprising a free wheel (not shown) activated by the battery 8b is thus used. Alternatively, this starter 8a can be replaced with a reversible direct-current or alternating-current machine in order to meet an additional requirement (safety, reliability, power level, etc.). This electrical machine will be driven solely by the APU unit.

Figure 6B:
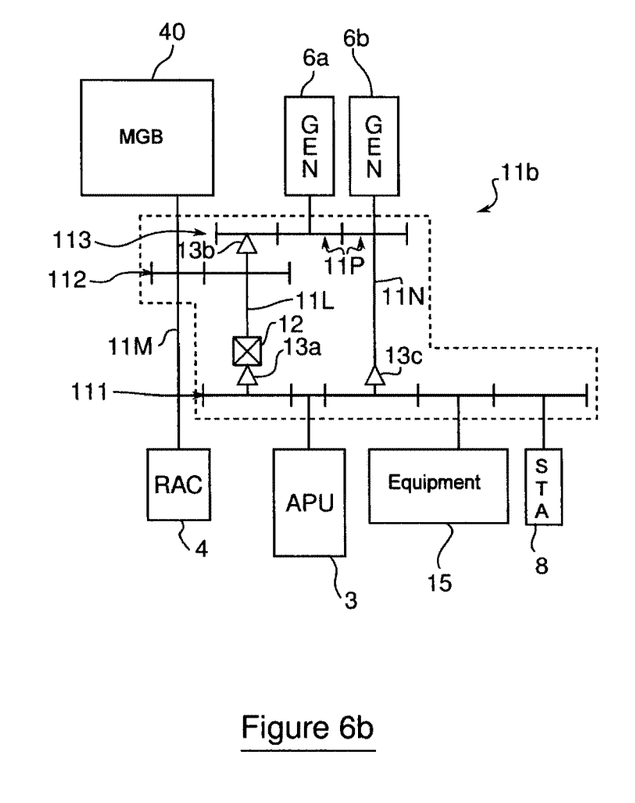

With reference to FIG. 6b, the stub shaft 11L is equipped with the reversible pawl 12 and the free wheel 13a in order to drive the power take-off 11M of the MGB 40/ATR 4 assembly, in the manner of the stub shaft 11L (FIGS. 3b and 4b). The stub shaft 11N also drives, on a third line of gears 113, the generators 6a and 6b via gear pinions 11P. The third line of gears 113 is mounted via free wheels 13b and 13c respectively on the stub shaft 11L and on a second stub shaft 11N between a generator 6b and the APU unit 3.

The generators 6a and 6b of the APU unit 3 are used on the ground in the conventional APU mode, this configuration thus making it possible to fairly distribute the functions of electrical generation.

The reduction gear assembly 11b has the same advantages as the assembly 11a as shown above, in particular the main rotor cannot be driven on the ground and the auxiliary engine (APU unit 3) cannot be driven by the main rotor during flight. In addition, the generators 6a and 6b for converting energy are driven by the auxiliary engine on the ground when the engines are switched off, and by the MGB on the ground or during flight when the auxiliary engine is switched off (or even when its rotational speed is less than the speed of the shaft 11L, the free wheels 13a and 13c then being released).

More particularly, the diagrams in FIGS. 7a to 7d show the same four operating phases from FIGS. 5a to 5d when the reduction gear assembly is of the 11b type, shown in FIG. 6b.

Figure 7A:
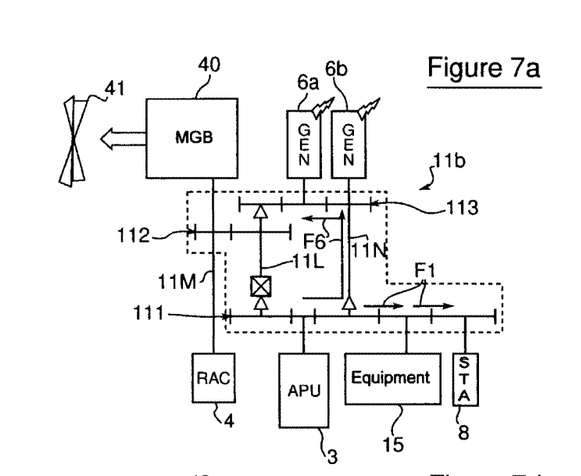
FIGS. 7a to 7d are diagrams of the reduction gearbox according to FIGS. 6a and 6b in the four operating phases corresponding to FIGS. 5a to 5d.

With reference to FIG. 7a, the stub shaft 11L is decoupled and the APU unit 3 provides mechanical power (arrows F1) to the equipment 15 and to the reversible machine 8 with the aim of providing electrical energy when required, as well as electrical power via the generators 6a and 6b by means of the second stub shaft 11N (arrows F6). If the machine 8 is a simple starter, a free wheel is advantageously integrated in order to avoid driving it unnecessarily.

Figure 7B:
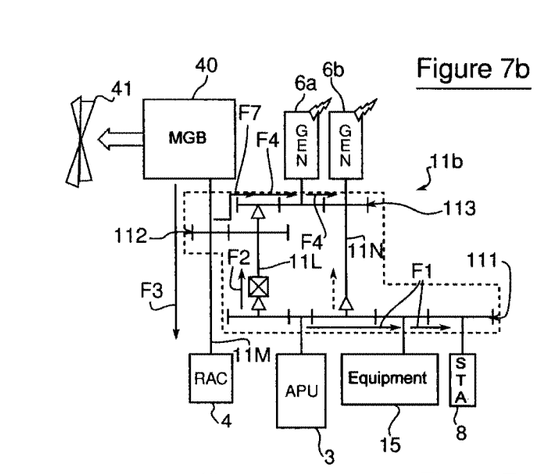

With reference to FIG. 7b, the APU unit 3 always provides mechanical power (arrows F1) to its equipment 15 and to the reversible machine 8 (when required) via the line of gears 111. When the pawl 12 is engaged (arrow F2), the APU unit 3 can also provide propulsive mechanical power—via the line of gears 112—to the power take-off 11M of the MGB 40/ATR 4 assembly (arrow F3) in order to provide propulsive power in particular to the ATR rotor 4. The APU unit 3 can also provide mechanical power to the generators 6a and 6b (arrows F4) via the line of gears 113 in order to deliver electrical power to the on-board network 2. The APU unit 3 can also provide power directly to the generators 6a and 6b via the stub shaft 11N, in particular when the pawl 12 is disconnected. However, when the main engines 5a/5b are switched on, the MGB 40, driven by these engines 5a/5b, can also transmit power to the generators 6a and 6b (arrow F7).

Figure 7C:
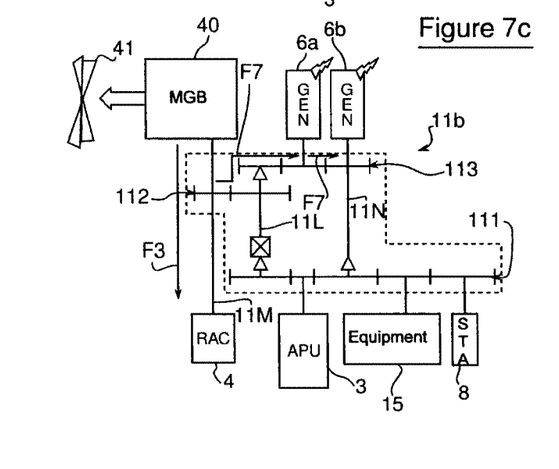

With reference to FIG. 7c, when the APU unit 3 is switched off but the engines 5a/5b are switched on, the MGB 40—driven by the engines 5a/5b—then transmits power to the generators 6a and 6b (arrows F7) in order to provide non-propulsive power to the on-board network 2, but it does not transmit power to the APU unit 3, since the free wheels 13a and 13b are disconnected.

Figure 7D:
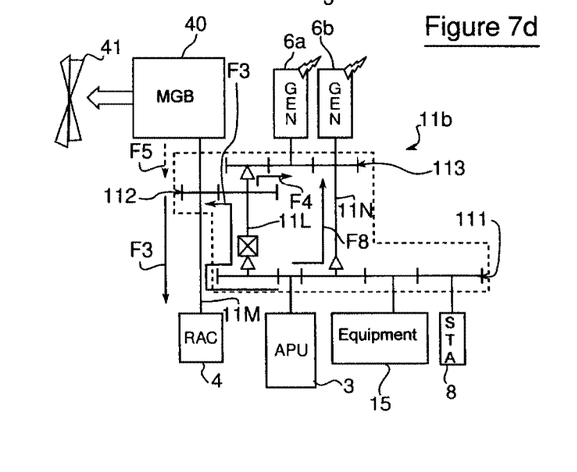

With reference to FIG. 7d, when a main engine 5a is idling (arrow F5 in pointed lines) or stopped (voluntarily or involuntarily) and the pawl 12 is engaged, the APU unit 3 provides mechanical power (arrow F1) to the equipment 15 and to the reversible machine 8 (if required), propulsive power to the power take-off 11M of the MGB 40/ATR 4 assembly (arrows F3)—in particular to the ATR 4 and optionally to the main rotor 41—as well as to the generators 6a and 6b (arrows F4) in order to provide electrical power to the on-board network 2. Thus, the APU unit 3 provides, on the lines of gears 112 and 113, all the non-propulsive power and some of the propulsive power. The APU unit 3 can also provide power directly to the generators 6a and 6b via the stub shaft 11N (arrow F8), in particular when the pawl 12 is disconnected.

The preceding architectures have an auxiliary engine of the APU unit type, comprising a single power shaft (for example a diesel engine or a connected turbine). For an auxiliary engine having a free power turbine of the main engine type, two power shafts are available: the shaft of the free turbine and the shaft of the gas generator. Two architectures of reduction gear assemblies 11c and 11d are described below with reference to FIGS. 8a and 8b in order to show the power take-off from the two shafts of a free-turbine gas turbine 10 as an auxiliary engine.

Figure 8A:
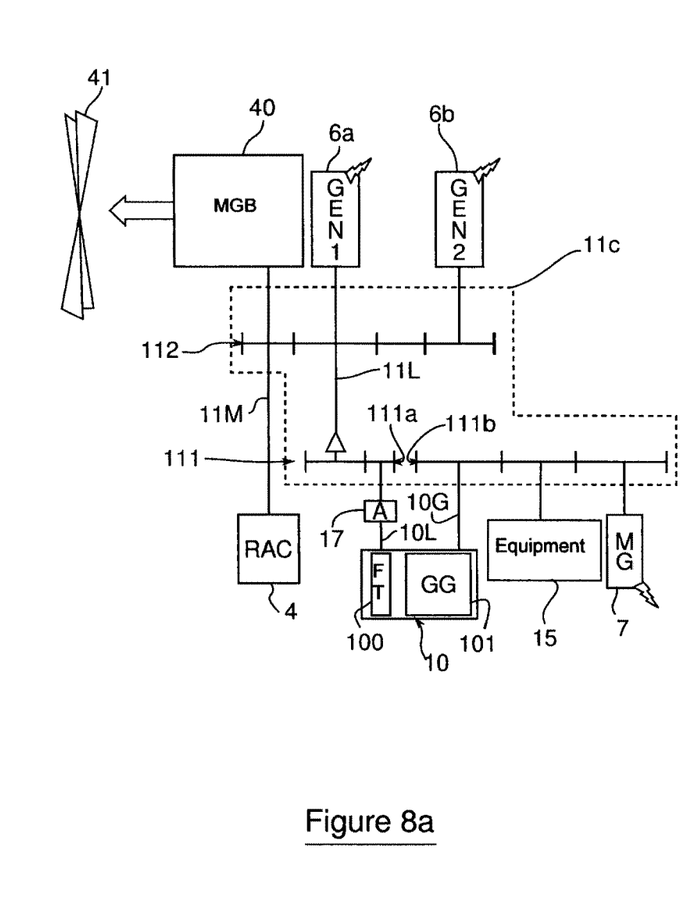
FIGS. 8a and 8b are two diagrams of reduction gear assemblies in the case in which the auxiliary engine is a free-turbine gas turbine, respectively with and without a means for reversibly coupling the free turbine.
Figure 8B:
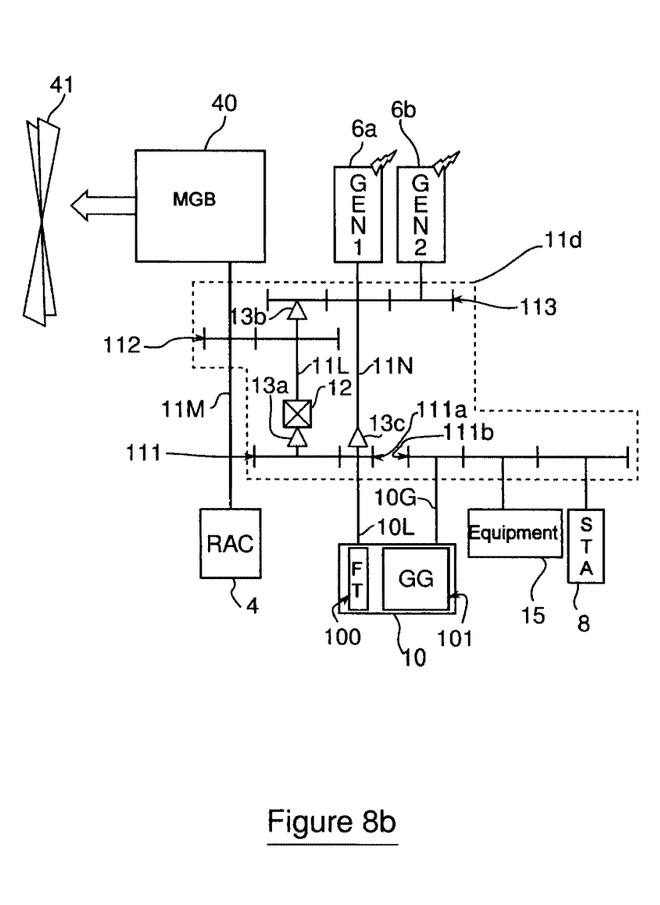

In FIGS. 8a and 8b, the reduction gear assemblies 11c and 11d are respectively without and with a pawl 12, as a means for reversibly coupling the shaft 10L of the free turbine 100. The diagram of the reduction gearbox in FIG. 8a again uses that from FIG. 4b, with two lines of gears 111 and 112, and that in FIG. 8b again uses the diagram of a reduction gearbox 6b, with three lines of gears 111 to 113.

With reference to FIG. 8a, the reduction gear assembly 11c has two lines of gears 111 and 112. The shaft 10L of the free turbine 100 drives the generators 6a and 6b on the second line of gears 112, via the stub shaft 11L mounted with the free wheel 13a. The stub shaft 11L does not have a declutching system, but has the free wheel 13a in order to avoid driving the free turbine 100 by means of the MGB 40. The shaft 10L is mounted on a portion 111a of the first line of gears 111 via a brake 17. The shaft 10G of the gas generator 101 of the gas turbine 10 is mounted on a portion 111b of the first line of gears 111 which is independent of the portion 111a. The shaft 10G drives, on this line 111b, the equipment 15 and the generator of the motor generator 7, independently of the free turbine 100.

The brake 17 makes it possible to lock the shaft 10L of the free turbine on the ground in order to use the gas turbine 10 in the conventional operation of an APU unit (APU mode: electrical generation by the motor generator 7 and pneumatic generation by a load compressor on the shaft 10G of the gas generator, etc.). This brake 17 can advantageously be combined with the brake of the shaft of the ATR rotor 4. This architecture is similar to a helicopter architecture having three engines, the third engine of which—forming the auxiliary engine—would be asymmetrical in power with respect to the two others.

The architecture of the reduction gear assembly 11d, shown in FIG. 8b, again uses all the elements of the reduction gear assembly 11b from FIG. 6b with the same functions. The difference in structure relates to the independence of the connections of the shaft 10L of the free turbine 100 of the gas turbine 10, mounted on the portion 111a, and of the shaft 10G of the gas generator 101 of this gas turbine 10, mounted on the portion 111b. In this architecture, the gas turbine 10 replaces the APU unit 3 from FIG. 6b as an auxiliary engine. In particular, the third line of gears 113 is mounted with a free wheel 13*b* on the stub shaft 11L equipped with a reversible pawl 12 or the equivalent and the free wheel 13*a*, as well as on the second stub shaft 11N with a free wheel 13*c*, between the shaft 10L of the free turbine 100 and the generator 6*a* for electrical power supply.

Therefore, the accessories (equipment 15: pump, load compressor, etc., and starter 8*a*) connected to the gas generator 101 are separate from the accessories (generators 6*a* and 6*b* and helicopter equipment: MGB 40, ATR 4, etc.) connected to the free turbine 100.

Regulation of the auxiliary engine having a free turbine will be different from that of the engine having a connected turbine when the auxiliary engine is connected to the MGB/ATR take-off assembly because this ATR is then connected to the free turbine 10 and not to the gas generator 101.

The invention is not limited to the embodiments described and shown, in particular the free wheels can be replaced with equivalent means (release sleeve, viscous coupling, epicyclic gear train, etc.) or the different components (free wheel, pawl, etc.) can be placed differently on the different lines of pinions. The scope of the term 'auxiliary engine' extends to engines using technology that is different from that of a gas turbine (for example: a diesel engine, a fuel cell, etc.). Thus, this auxiliary engine may be the engine of a three-turbine helicopter which has smaller dimensions and inferior performance compared with the dimensions and performance of the two other main engines.

The invention claimed is:

1. A method for supplying at least one of propulsive or non-propulsive power in a helicopter architecture including
   an on-board power supply network,
   a main traction system coupled to a mechanical transmission system which drives propulsion members during flight, and
   an energy conversion system for converting mechanical energy into electrical energy coupled to at least one of the mechanical transmission system or to the main traction system providing non-propulsive power to the on-board power supply network,
   the method comprising:
   when the helicopter is on ground, coupling an auxiliary engine to the on-board power supply network via the energy conversion system to provide the on-board power supply network with non-propulsive power, and coupling the auxiliary engine to the main traction system for start-up of the main traction system; and
   when the helicopter is in flight, coupling the auxiliary engine to the on-board power supply network to provide non-propulsive power to the on-board power supply network, and coupling the auxiliary engine to a dedicated traction system on the mechanical transmission system to provide a portion of the propulsive power,
   wherein the auxiliary engine is coupled to the energy conversion system and to the mechanical transmission system via a speed-reduction system,
   wherein, in a first operating state of the speed-reduction system when the helicopter is on the ground, the auxiliary engine is switched on and the main traction system is switched off, and
   wherein, in a second operating state of the speed-reduction system when the helicopter is in flight, the auxiliary engine is switched on and the main traction system is switched on.

2. A method for supplying energy according to claim 1, wherein the auxiliary engine is coupled by a reversible energy conversion system to the on-board power supply network to provide non-propulsive power to the main traction system for the start-up of the main traction system in the first operating state of the speed-reduction system.

3. A method for supplying energy according to claim 1, wherein the electrical energy from the on-board power supply network comes from an adjustment between energy drawn off on the mechanical transmission and the main traction system by the energy conversion system.

4. A method for supplying energy according to claim 3, wherein the energy conversion system is connected only to the speed-reduction system such that the electrical energy of the on-board power supply network only comes from the auxiliary engine via the speed-reduction system when the main traction system is switched off.

5. A method for supplying energy according to claim 3, wherein the auxiliary engine is integrated directly in the mechanical transmission system such that the auxiliary engine provides electrical energy to the on-board power supply network by converting energy with generators on the mechanical transmission system, and provides propulsive power to at least one propulsion member via the mechanical transmission system.

6. A configuration for supplying at least one of propulsive or non-propulsive power in a helicopter, comprising:
   an on-board power supply network;
   two main engines coupled to a mechanical transmission system which drives propulsion members during flight;
   an energy conversion system for converting mechanical energy into electrical energy between a main gearbox of a system for mechanical transmission to the propulsion members and means for receiving electrical energy comprising the on-board power supply network and power electronics in conjunction with starters of the main engines;
   an auxiliary engine for providing electrical energy to the means for receiving electrical energy via the energy conversion system;
   a dedicated traction system on the mechanical transmission system which couples the auxiliary engine and at least one of the propulsion members; and
   a speed-reduction system which couples the auxiliary engine to the energy conversion system and to the mechanical transmission system,
   wherein when the helicopter is on ground and the speed-reduction system is in a first operating state, the auxiliary engine is coupled to the on-board power supply network via the energy conversion system to provide the on-board power supply network with non-propulsive power, and the auxiliary engine is coupled to the main traction system for start-up of the main traction system, and
   wherein when the helicopter is in flight and the speed-reduction system is in a second operating state, the auxiliary engine is coupled to the on-board power supply network via the energy conversion system to provide non-propulsive power to the on-board power supply network, and the auxiliary engine is coupled to the dedicated traction system on the mechanical transmission system to provide a portion of the propulsive power.

7. A configuration for supplying energy according to claim 6, wherein the auxiliary engine is selected from an APU unit, a free-turbine or connected-turbine gas turbine, and a diesel engine.

8. A configuration for supplying energy according to claim 7, wherein the energy conversion system comprises generators or reversible motor generator units connected to at least one of the main gearbox, the main engines, or the auxiliary engine to provide electrical energy to the on-board power supply network and to the power electronics.

9. A configuration for supplying energy according to claim 8, wherein the auxiliary engine is integrated in the main gearbox in conjunction with the generators to provide non-propulsive power, the auxiliary engine configured to provide non-propulsive power to the on-board power supply network and to the power electronics via the generators on the main gearbox and propulsive power via the main gearbox to the at least one of the propulsion members.

10. A configuration for supplying energy according to claim 8, wherein the speed-reduction system is a reduction gear assembly belonging to the mechanical transmission system.

11. A configuration for supplying energy according to claim 10, wherein the reduction gear assembly directly connects the auxiliary engine to at least one of the main gearbox or to a drive shaft of the anti-torque rotor, and the auxiliary engine to at least one of a motor generator or to at least one generator forming part or all of the energy conversion system to provide electrical energy to the on-board power supply network and to the power electronics.

12. A configuration for supplying energy according to claim 11, wherein the reduction gear assembly comprises at least two lines of speed reduction gears coupled by at least one stub shaft between the auxiliary engine mounted on the first line and a power take-off on the main gearbox or the propulsion member mounted on the second line, and wherein at least one stub shaft includes a reversible decoupling means and a free wheel so that the auxiliary engine does not drive the main rotor on the ground, and the main rotor does not drive the auxiliary engine on the ground or during flight, respectively.

13. A configuration for supplying energy according to claim 12, wherein, in a case in which the generator of the energy conversion system is connected directly to the reduction gear assembly, the stub shaft including the reversible decoupling means and the free wheel drives the power take-off and the generator mounted via a free wheel on at least one of the second line of gears or on at least a second stub shaft including a free wheel between a generator and the auxiliary engine.

14. A configuration for supplying energy according to claim 12, wherein the auxiliary engine has a free turbine which drives the generator on the second line of gears of the reduction gearbox by a stub shaft including a free wheel and a brake or on a third line of gears mounted with a free wheel on a stub shaft including a reversible decoupling means and a free wheel and on at least a second stub shaft mounted with a free wheel between the free turbine and a generator.

* * * * *